United States Patent [19]
DeRossi

[11] 3,762,618
[45] Oct. 2, 1973

[54] DEVICE ENABLING TO PERFORM THE REWINDING OF THE FILM IN A SOUND MOTION PICTURE PROJECTOR

[76] Inventor: Piero DeRossi, Corso Giovanni Lanza 55, Torino, Italy

[22] Filed: May 24, 1972

[21] Appl. No.: 256,542

[30] Foreign Application Priority Data
July 31, 1971 Italy .................................... 69586

[52] U.S. Cl. .................... 226/76, 226/156, 352/173
[51] Int. Cl. .......................................... G03b 1/24
[58] Field of Search ............... 226/49, 76, 37, 152, 226/156, 188; 192/41, 45, 45.1; 352/173

[56] References Cited
UNITED STATES PATENTS
2,534,083  12/1950  Van Den Broek.............. 352/173 X
3,107,872  10/1963  Bugge .............................. 192/41 R

*Primary Examiner*—Richard A. Schacher
*Attorney*—Irvin S. Thompson et al.

[57] ABSTRACT

A device for allowing rewinding of the film in a sound motion picture projector, wherein the drive sprocket intended for uniformly driving the film on the pick-up members of the sound track is idly mounted on its driven shaft, and a unidirectional joint is inserted between the shaft and the sprocket for connecting rigidly both parts in the forward direction of rotation and for allowing free rotation of the sprocket when the shaft rotates in reverse direction.

10 Claims, 3 Drawing Figures

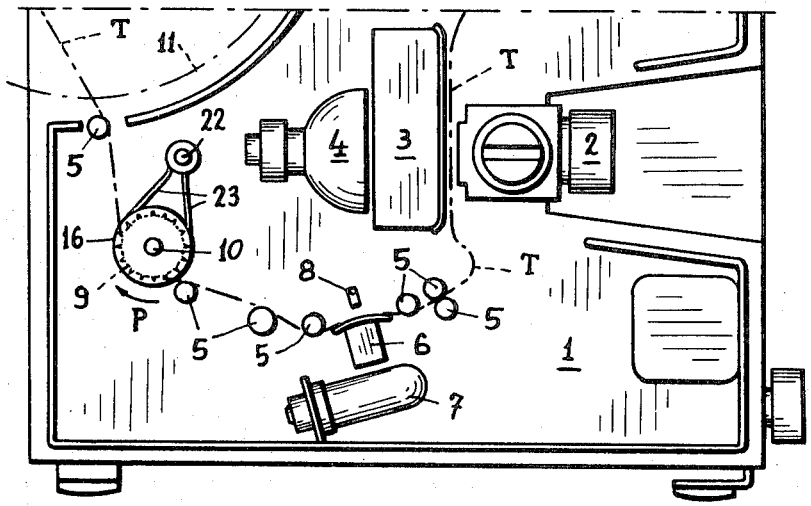
Fig. 1
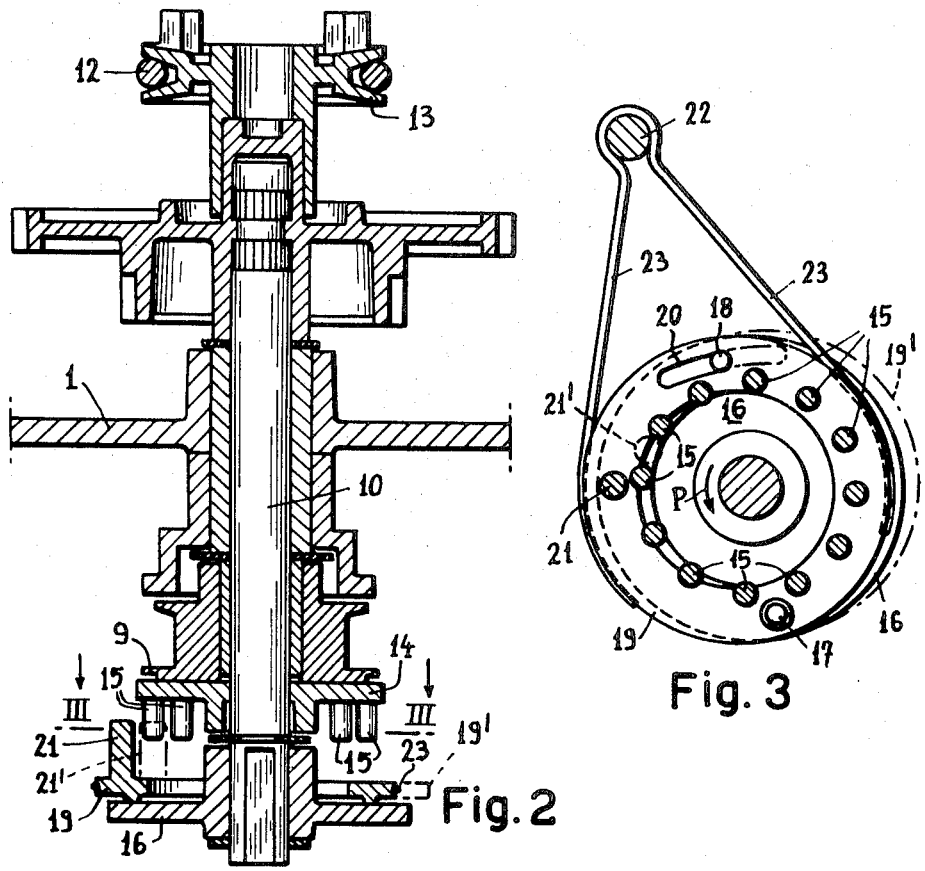
Fig. 2
Fig. 3

DEVICE ENABLING TO PERFORM THE REWINDING OF THE FILM IN A SOUND MOTION PICTURE PROJECTOR

BACKGROUND OF THE INVENTION

The present invention relates to a device which allows one to carry out, in a sound motion picture projector, particularly for 8 mm films, a rapid rewinding of the film without having to remove the film from its run path between the pick-up members of the sound track, whether the latter is of the optical or magnetic type.

For a correct pick-up of the sound track of a motion picture film it is necessary that the film passes at a perfectly uniform speed in front of the pick-up head, in spite of its being moved intermittently by the advancement claw. Such uniformity cannot be sufficiently ensured by the traction which is exerted by the collecting spool, wherefore, in the case of sound motion picture projectors, it is necessary to guide the film around a drive sprocket after its passage on the pick-up head and prior to its being conveyed to the collecting spool. Accordingly, while in the silent film projectors a rapid rewinding may be carried out without modifying the projection run of the film and by merely disengaging from the film the advancement claw, in a sound motion picture projector it is necessary to disengage the film from the sprocket, which particularly requires that the film be removed from its normal run path and be guided along a different particular rewinding path. This involves particular difficulties if the rewinding is initiated while the film is still connected to the uncoiling spool, that is to say systematically whenever the film is derived from a cartridge or magazine in which it is steadily fixed to the inner spool of the cartridge or magazine.

BRIEF SUMMARY OF THE INVENTION

The object of this invention is to provide a device which allows rewinding of the film in a sound motion picture projector without having to modify previously the run path of the film or to disengage it from the drive sprocket.

In accordance with the invention, the device which allows rewinding of the film in a sound motion picture projector, comprising a sprocket that meshes with the film and is carried by a shaft which is driven by the motor of the projector, is characterized in that the sprocket is mounted idly on said driven shaft and that a unidirectional joint is inserted between said sprocket and said driven shaft, which joint is suitable for connecting rigidly the sprocket to the shaft when the shaft is rotated in a direction which corresponds to the advancement of the film, and for allowing a free rotation of the sprocket when the shaft is rotated in the opposite direction, which corresponds to the rewinding of the film.

Therefore, when the projector is under projection conditions, the sprocket, which is rigidly connected to the driven shaft, acts as an ordinary drive sprocket of a sound motion picture projector, whereas when the projector is in the rewinding state and consequently the rotation of its driven members is reversed, the sprocket becomes idle and, while still being in meshing engagement with the film, it is in a position to follow the rapid rewinding movement of the film without opposing hindrances or harmful resistances.

BRIEF DESCRIPTION OF THE DRAWINGS

The features and advantages of the device according to the invention will appear more clearly from the following description of a non limitative embodiment, which is illustrated in the accompanying drawing, wherein:

FIG. 1 shows on a reduced scale and as diagrammatically as possible the lower portion of a motion picture projector, comprising the means for the pick-up of the sound track and the means for driving the film at a uniform speed;

FIG. 2 shows an axial section of the device according to the invention, which allows one to carry out the rewinding of the film without having to modify its run, and FIG. 3 shows a section taken along the line III—III of FIG. 2, as seen from the rear in the direction of the arrows.

DETAILED DESCRIPTION OF THE PREFERRED EMBODIMENT

Reference numeral 1 indicates the lower portion of the structure of a motion picture projector, particularly a projector for 8 mm films, which structure supports the projection lens 2, advancement and shutter means 3, a projection lamp 4, a set of film guiding rollers 5, a pick-up head 6 which in the embodiment shown is of optical type and cooperates with a pick-up lamp 7 and a photodiode 8, and a sprocket 9 mounted on a shaft 10. The film, which derives from a common feeding spool or a cartridge (not shown) and runs towards a collecting spool 11, follows a run path T between the above mentioned members after which it passes around and meshes with the sprocket 9. The sprocket is driven, through the shaft 10, by the motor (not shown) of the projector at a uniform speed and in synchronism with the movement of the advancement means acting on the film, all this being performed in a manner which is well known to those skilled in the art.

In a common projector of this type it is impossible to perform a rapid rewinding by simply reversing the movement of the driven members of the projector and disengaging the advancement claw from the film, because the sprocket 9 prevents the film from moving at a speed greater than that conditioned by the rotational movement of shaft 10. On the other hand, a disengagement of the film from the sprocket 9 without modifying radically (as usual) the run path of the film would meet with considerable technical difficulties.

In the illustrated embodiment of the device according to the invention, the sprocket 9 is mounted free rotatably on the shaft 10 instead of being keyed directly to it, and said shaft is in turn pivotally mounted in the structure and is provided, for example, with a pulley 13 which serves to connect the shaft by means of a belt 12 to the driving means of the projector. Freely rotatable on the shaft 10 and fixed to the sprocket 9 is also a wheel 14 having on its surface opposed to the sprocket 9 a number of projecting pins 15 uniformly spaced around the periphery of the wheel. Keyed on the shaft 10 in front of the wheel 14 and its pins 15 is a disc 16 provided with two peripheral pins 17 and 18 which are almost diametrically opposed to each other and face the wheel 14. A ring 19 is pivotally mounted on the pin 17 of disc 16 and is provided with an elongated slot 20 which engages with pin 18, so that the ring 19 may be displaced in respect of disc 16 between the two positions 19 and 19' which are eccentrical in opposite directions and are represented respectively by solid lines and dot-and-dash lines in FIGS. 2 and 3. The ring 19 carries a pin 21 which is directed towards the wheel and is disposed in such a position that, when the ring 19 is in the position represented by solid lines, the pin 21 is out of the path of pins 15 of wheel 14; whereas, when the ring is in the position 19' represented by dot-and-dash lines, the pin of the ring interferes with the path of said pins 15, and is located between two successive pins 15, in the position 21' which is also indicated by dot-and-dash lines in FIGS. 2 and 3.

In the vicinity of the shaft 10, on the structure 1 of the projector is mounted a support 22 carrying a spring clip 23 which surrounds the preferably grooved periphery of the ring 19 and clasps it elastically thereby producing a slight friction torque.

When the projector is in the state of projection, the shaft 10, and with it the disc 16, rotates in direction of advancement of the film, as indicated by arrows P. The ring 19, which is slightly braked by clip 23, tends to remain left behind and therefore it rotates around the pin 17 of disc 16 and takes the position indicated by dot-and-dash lines. Its pin 21' enters between two successive pins 15 of wheel 14 thus establishing a joint thanks to which the wheel 14, and with it the sprocket 9, is driven positively as if it were keyed on the shaft 10. Consequently, the sprocket 9 drags the film as in an ordinary projector.

When the rotation direction of shaft 10 is reversed to operate the fast rewinding, the disc 16 rotates in the direction opposite the arrow P, and the ring 19, which is retained by clip 23, rotates around the pin 17 and takes the position indicated by solid lines. Thus the pin 21 places itself out of the path of the pins 15 of wheel 14, and the latter, together with the sprocket 9, is no more coupled to disc 16 and therefore it remains freely rotatable on the shaft 10. Then the film may be rewound at a high speed by the associated spool, and the sprocket 9 rotates freely and follows the high speed of the film without braking or hindering it. Thus the rewinding operation may be accomplished without modifying the run path T of the film, which path remains the same as in the projection state of the projector. In this manner the rewinding may be effected starting from any point along the film and without having to disengage the film from the projector parts which define its run path, and particularly a rapid rewinding of the film may be effected also in a sound motion picture projector provided with a cartridge, magazine or similar film container.

The mechanism 14-23 forming a unidirectional joint is particularly suitable for the specified purpose, but it is intended that other unidirectional joint types may be used within the scope of the invention. The device according to the invention may be applied both in the sound motion picture projectors with optical pick-up, such as the one which has been illustrated herein as an example, and in the projectors with magnetic pick-up, as well as in those which are suitable for both kinds of sound track pick-up.

Having thus described my invention, what I claim is:

1. In a sound motion picture projector comprising a drive shaft and mounted onto said shaft a drag sprocket intended for meshing engagement with the film, the improvement comprising a wheel rigidly connected to said sprocket, insertion means provided onto said wheel, a disc keyed onto said drive shaft, a ring peripherically pivoted onto said disc and eccentrically movable between a first and second position, a projection provided onto said ring, said projection being out of the path of said insertion means in the first of said positions of the ring, and being inserted between two successive insertion means in the second of said positions of the ring, and a braking means cooperating with said ring for slightly braking said ring in order to displace the same in the first or in the second of said positions respectively, according to the reverse or respectively forward direction of rotation of said drive shaft and keyed disc.

2. A device as set forth in claim 1, wherein said disc has first and second almost diametrically opposed pins, said ring being pivotally mounted onto the first of said pins and said ring having an elongated slot wherein the second of said pins is engaged in order to limit the displacement of said ring in respect of said disc and to define the said two positions of said ring.

3. A device as set forth in claim 1, wherein said insertion means of said wheel are a number of pins, said pins being directed towards said ring and being regularly spaced around said wheel at a uniform distance from the axis of said drive shaft, and said projection of the ring being a pin whose diameter is slightly smaller than the distance between two successive pins of said wheel.

4. A device as set forth in claim 1, wherein said disc has first and second almost diametrically opposed pins, said ring being pivotally mounted onto the first of said pins and said ring having an elongated slot wherein the second of said pins is engaged, said projection of the ring being provided in a position lying approximately on a diameter perpendicular to a line passing through the first of said pins and through said elongated slot.

5. A device as set forth in claim 1, wherein said braking means is a spring clip, said spring clip being mounted onto a fixed portion of the projector and surrounding and elastically clasping a portion of said ring.

6. In a sound motion picture projector comprising a drive shaft and a sprocket mounted on the drive shaft to mesh with the film; the improvement comprising insertion means connected to said sprocket for rotation with said sprocket, a coupling member rotatable with said drive shaft, means interconnecting said coupling member and said drive shaft for movement of said coupling member between a first position in which said coupling member is out of engagement with said insertion means and a second position in which said coupling member is engaged with said insertion means for conjoint rotation of said coupling member and insertion means and sprocket, and control means coacting with said coupling member to displace said coupling member to said second position upon forward rotation of said drive shaft and to displace said coupling member to said first position upon reverse rotation of said drive shaft, said control means maintaining said coupling member in said second position regardless of the direction of the force exerted by the film on the sprocket and maintaining said coupling member in said first position regardless of the direction of rotation of the sprocket relative to said drive shaft.

7. A device as set forth in claim 6, wherein said coupling member comprises a ring surrounding and spaced from said drive shaft and said interconnecting means comprises means pivotally interconnecting said ring and a member carried by said drive shaft about an axis parallel to but spaced from said drive shaft.

8. A device according to claim 7, and means limiting said pivotal movement of said ring.

9. A device according to claim 8, said limiting means comprising a pin and slot connection between said ring and said member carried by said drive shaft.

10. A device according to claim 7, and a projection on said ring that fits between any of a plurality of spaced projections on said insertion means.

* * * * *